United States Patent [19]

Self

[11] 4,061,613

[45] Dec. 6, 1977

[54] SEMISOLID POLYMERIZABLE COMPOSITIONS, METHOD OF PREPARING THE SAME AND THERMOSET PRODUCTS THEREOF

[75] Inventor: James M. Self, Pittsburgh, Pa.

[73] Assignee: H. H. Robertson Company, Pittsburgh, Pa.

[21] Appl. No.: 655,012

[22] Filed: Feb. 4, 1976

Related U.S. Application Data

[63] Continuation-in-part of Ser. No. 597,673, June 21, 1975, abandoned, which is a continuation-in-part of Ser. No. 544,966, Jan. 29, 1975, Pat. No. 4,011,195, which is a continuation-in-part of Ser. No. 460,489, April 12, 1974, abandoned.

[51] Int. Cl.$^2$ .............................................. C08K 3/34
[52] U.S. Cl. ........................... 260/40 R; 260/29.2 UA
[58] Field of Search ....................... 260/29.20 A, 40 R

[56] References Cited

U.S. PATENT DOCUMENTS

| | | | |
|---|---|---|---|
| 3,240,736 | 3/1966 | Beckwirth | 260/29.2 UA |
| 3,392,127 | 7/1968 | du Tertre | 260/40 R X |
| 3,437,619 | 4/1969 | Nutt | 260/29.2 UA |
| 3,733,285 | 5/1973 | Steffy | 260/40 R X |
| 3,798,174 | 3/1974 | Acker et al. | 260/40 R X |

*Primary Examiner*—Sandra M. Person
*Attorney, Agent, or Firm*—Harry B. Keck; George E. Manias

[57] ABSTRACT

Semisolid polymerizable compositions are obtained by combining unsaturated polyester resin syrup, aqueous sodium silicate and finely divided particulate calcium sulfate hemihydrate. The composition rapidly thickens to a semisolid state when the ingredients are mixed and retains its semisolid condition for extended periods of time. The unsaturated polyester resin syrup component of the mixture remains polymerizable until its polymerization is initiated, normally by means of heating in the presence of a high temperature polymerization initiator. Sufficient calcium sulfate hemihydrate is included to react with substantially all of the uncombined water in the other ingredients so that the resulting polymerizable composition is substantially free of uncombined water. The compositions may also contain inert fillers and/or reinforcing fibers. The compositions can be employed to produce coatings, laminates, cast articles, molded articles and other shaped articles.

The compositions may be employed in either of two alternative procedures. In the direct processing of the compositions, they are mixed, immediately formed and immediately polymerized to produce useful products. In the two stage processing of the compositions, they are mixed, allowed to thicken without polymerization and are retained as a semisolid polymerizable composition which is useful as a molding compound in the form of dough molding compounds, sheet molding compounds or molding powders. In all of these procedures, the preferred compositions include reinforcing glass fibers as an essential ingredient.

12 Claims, No Drawings

SEMISOLID POLYMERIZABLE COMPOSITIONS, METHOD OF PREPARING THE SAME AND THERMOSET PRODUCTS THEREOF

CROSS-REFERENCES TO RELATED APPLICATIONS (IF ANY)

This application is a continuation-in-part of my copending application Ser. No. 597,673 filed June 21, 1975 (now abandoned) which was a continuation-in-part of my copending application Ser. No. 544,966 filed Jan. 29, 1975 now U.S. Pat. No. 4,011,195 which is a continuation-in-part of my earlier filed U.S. application Ser. No. 460,489 filed Apr. 12, 1974 (now abandoned).

BACKGROUND OF THE INVENTION

1. Field of the Invention

The invention relates to semisolid polymerizable unsaturated polyester resin syrup compositions, to methods of making such compositions, to methods of curing such compositions and to the thermoset products obtained by polymerizing such compositions.

2. Description of the Prior Art

Unsaturated polyester resin syrups have been employed in the production of a wide variety of products. See Polyester Resins and Their Applications, Bjorksten et al, Reinhold Publishing Company, New York, 1960 (Fourth Printing). The unsaturated polyester resin syrups customarily are reinforced with fibrous fillers such as glass fibers and also are extended with inert particulate fillers such as wood flour, silica, ground glass, clay, calcium carbonate, and the like. Typical end products include flat and profiled building sheets, automobile components, furniture, plumbing fixtures, ductwork, boats, electrical housing components, electrical circuit boards and the like.

Copending application Ser. No. 544,966, supra, describes compositions containing unsaturated polyester resin syrups and aqueous sodium silicate which thicken and remain polymerizable until exposed to polymerizing conditions. In a preferred embodiment of my prior process, the unsaturated polyester resin syrup and the aqueous sodium silicate are combined and polymerized concurrently. In a further embodiment of the earlier invention, the aqueous sodium silicate and unsaturated polyester resin syrup are combined, with or without fillers, and allowed to thicken for subsequent reuse. One typical reuse is in the form of molding powders where the thickened mixtures are ground, chopped or pulverized for subsequent molding.

One of the shortcomings of the polymerizable mixtures is that the requirement for thickening establishes some restraints on the ratio of aqueous sodium silicate and unsaturated polyester resin syrup which may be combined for developing specific thickening characteristics. The act of mixing the unsaturated polyester resin syrup with the aqueous sodium silicate brings about changes in the composition of both the aqueous sodium silicate and the unsaturated polyester resin syrup. Specifically the aqueous sodium silicate forms, at least in part, a hybrid silica gel. The unsaturated polyester resin syrup has its carboxylic end groups converted to carboxylate salts of sodium. Some quantities of free water are released in the resulting system. The resulting material is not an emulsion but instead appears to be a mixture of the ingredients.

The mixture may harden rapidly or slowly to a final consistency depending upon the ratios of aqueous sodium silicate and unsaturated polyester resin syrup. There is a need for regulating the thickening rate and final consistency of such mixtures. Rapid thickening is particularly desirable when manufacturing sheet molding compounds, bulk molding compounds or molding powders.

SUMMARY OF THE INVENTION

According to the present invention, a quantity of calcium sulfate hemihydrate is added to the mixture of unsaturated polyester resin syrup and aqueous sodium silicate to absorb free water and provide a means for regulating the thickening rate and final consistency of the mixtures.

The overall resulting mixtures are semisolid polymerizable compositions containing one part by weight of unsaturated polyester resin syrup, 0.1–2.0 parts by weight of aqueous sodium silicate and 0.1–2.0 parts by weight of calcium sulfate hemihydrate. The amount of the calcium sulfate hemihydrate should be sufficient to combine with at least 85 percent by weight of the uncombined water which is contained in the other ingredients of the composition. In addition the mixtures can contain inert fillers which may be finely divided particulate substances or fibrous fillers in the amount of 0.1 to 5.0 parts by weight. Typical inert fillers include chalk, silica, ground glass, glass spheres, powdered stone, wood flour, glass fibers, perlite, vermiculite, asbestos fibers, animal fibers, vegetable fibers, plastic fibers and the like.

In a preferred embodiment of the invention the calcium sulfate hemihydrate is mixed with the unsaturated polyester resin syrup and that mixture is combined with aqueous sodium silicate. After these ingredients have been combined the inert solids are thereafter introduced into the mixtures.

The unsaturated polyester resin syrup also preferably contains an initiator for its polymerization, preferably a high temperature initiator such as dicumylperoxide, which will not initiate polymerization at the exothermic temperatures resulting from the act of mixing. Polymerization promoters also may be included in the syrup.

UNSATURATED POLYESTER RESIN SYRUP

This is a term applied to solutions of unsaturated polyester resins in copolymerizable monomers such as styrene, alpha methyl styrene, o-chloro styrene, vinyltoluene, acrylates and methacrylates, acrylic and methacrylic acid, divinylbenzene and the like. The unsaturated polyester resin is the polyesterification reaction product of dicarboxylic acids and polyhydric alcohols wherein at least a portion of the dicarboxylic acid has alpha-beta ethylenic unsaturation. The dicarboxylic acids may include dicarboxylic acid anhydrides such as maleic anhydride, phthalic anhydride, tetrahydrophthalic anhydride. Other dicarboxylic acids include phthalic acid, adipic acid, succinic acid, tetrahydrophthalic acid, tetrabromophthalic acid, maleic acid, fumaric acid and the like. Typical polyhydric alcohols include glycols such as ethylene glycol, propylene glycol, butylene glycol, neopentyl glycol, diethylene glycol, dipropylene glycol, polyethylene glycol, polypropylene glycol. Occasionally trihydric or higher polyols are employed in a polyester such as trimethylolethane, trimethylolpropane, pentaerythritol. Customarily a slight stoichiometric excess of the polyhydric alcohol is employed in the preparation of the unsaturated polyester resins. Customarily the copolymerizable monomer comprises from 10 to 40 weight percent of the resulting syrup, that is, the unsaturated polyester resin comprises 90 to 60 weight percent of the resin syrup.

RESIN INITIATORS

Typical initiators for unsaturated polyester resin syrups include peroxy materials such as benzoyl peroxide, cumene hydroperoxide, tertiary butyl peroxide and the like. A particularly useful peroxy initiator for room temperature curing is 2,5-dimethyl hexane-2,5-dimethyl-diper-2-ethyl hexoate. Customarily peroxy initiators are provided in the form of a paste wherein the peroxy ingredient is dispersed in a glycol. The initiators normally are provided in amounts up to about 5 percent of the weight of the unsaturated polyester resin.

It is also customarily to include accelerators for the peroxy initiators in the form of organic metal salts such as cobalt nephthenate, cobalt octoate, molybdenum and copper and vanadium salts.

For the two stage processing of the present compositions in the form of molding powders or molding compounds, a high temperature initiator is preferred such as cumyl peroxide. Preferably the high temperature initiator will be effective at temperatures below about 250° F in order to minimize the vaporization of any free water which may be included in the system.

AQUEOUS SODIUM SILICATE

The aqueous sodium silicate is a liquid containing from 45 to 85 percent by weight water with the balance being sodium silicate. The weight ratio of $SiO_2/Na_2O$ is from about 1.5 to about 3.75. Commercially available aqueous sodium silicate may be diluted with additional water if desired to facilitate handling.

CALCIUM SULFATE HEMIHYDRATE

Calcium sulfate hemihydrate is commercially available as a dry powder and is known as plaster of paris. It is available commercially in a variety of formulations with inert additives. When one part by weight of the calcium sulfate hemihydrate is combined with about 0.18 parts by weight water, the material hardens to form calcium sulfate dihydrate — also known as gypsum. The calcium sulfate hemihydrate is the principal ingredient in most plasters.

The calcium sulfate hemihydrate preferably is added to the unsaturated polyester resin syrup and well dispersed therein prior to addition of the aqueous sodium silicate. After the addition of aqueous sodium silicate, the mixture is stirred vigorously and experiences a viscosity-increase which results from the reaction of the sodium silicate with the unsaturated polyester. The viscosity continues to increase as the water from the aqueous sodium silicate combines with the calcium sulfate hemihydrate to form gypsum. The gypsum in the resulting material introduces beneficial fire retardant properties. When exposed to fires, the gypsum slowly releases its contained water and absorbs heat thereby.

The amount of uncombined water in the other ingredients of the composition can be established by the selected ratio of aqueous sodium silicate to unsaturated polyester resin syrup. Sufficient calcium sulfate hemihydrate is included in the composition to react with at least 85 weight percent of the uncombined water from the other ingredients of the composition. In my aforementioned patent application Ser. No. 544,966, polymerizable mixtures of aqueous sodium silicate and unsaturated polyester resin syrup are described as being useful for molding compositions — that is, compositions which are essentially tack-free yet still polymerizable. Such compositions, while being tack-free solid materials, nevertheless may contain appreciable quantities of uncombined water which is deleterious in the subsequent molding operations. Such uncombined water will vaporize under molding conditions and create unwanted void spaces in the resulting molded article. This undesirable blowing of molded parts can be avoided if the uncombined water is reacted with calcium sulfate hemihydrate according to this invention. At least 85 percent by weight of the uncombined water and preferably 100 percent by weight of the uncombined water is reacted with the calcium sulfate hemihydrate according to the present invention, thereby avoiding the undesirable blowing tendency of the compositions.

INERT SOLIDS

Inert solids may be added to the mixture for a variety of purposes such as reducing the cost of the materials, increasing the strength of the resulting products, increasing the hardness of the resulting products, increasing the fire retardance of the resulting products. Particulate fillers include powdered glass, silica, chalk, clays, wood flour, hydrated alumina, crushed stones, perlite, expanded vermiculite, and the like. Fibrous inert additives include glass fibers, asbestos, rock wool, vegetable fibers, animal fibers, plastic fibers. The inert solids comprise about 0.1 to 5.0 parts by weight for each one part by weight of unsaturated polyester resin syrup.

The preferred compositions include reinforcing glass fibers of average length from one-quarter inch to about four inches. The glass fibers are normally provided from about 5 to about 30 percent by weight based upon the weight of the unsaturated polyester resin syrup in the composition.

Another preferred active filler is aluminum oxide trihydrate sometimes called hydrated alumina. The hydrated alumina increases the physical strength of the resulting products, i.e., hardness and abrasion resistance. The alumina hydrate also increases fire resistance of the products because of its included water of hydration. Where hydrated alumina is employed, up to one part by weight (based on the weight of unsaturated polyester resin syrup) and up to about three parts by weight (based on the weight of the aqueous alkali metal silicate) may be added. Thus the amount of hydrated alumina should be less than the sum of (a) the weight of unsaturated polyester resin syrup and (b) three times the weight of aqueous sodium silicate. The hydrated alumina preferably is provided as a powder passing through a 325 mesh U.S. standard screen.

DIRECT PROCESSING

According to one embodiment of the invention the ingredients are mixed and promptly polymerized after shaping of the material into the desired configuration by means of molding, pressing, casting, spray-up, or lay-up techniques. In this embodiment the polymerization initiator for the unsaturated polyester resin syrup may be provided in the resin syrup itself or may be provided in the aqueous sodium silicate. The mixing can occur in a mixing tank, a turbulent flow pipe or by means of impingement of sprays of the ingredients. Inert fillers may be incorporated in either or both of the liquid ingredients, that is, the unsaturated polyester resin syrup and the aqueous sodium silicate.

TWO STAGE PROCESSING

In the alternative embodiment of this invention where the ingredients are combined to prepare a molding composition, the mixture is allowed to harden in strips or sheets or may be extruded in the form of "spaghetti" prior to final hardening. After the composition has hardened in a desired shape, the composition is cut to a convenient size and packaged for use when and as desired in the form of a molding powder. The expression molding "powder" is perhaps inexact since the materials frequently are provided in the forms of flakes, pellets, lumps or chopped spgahetti. In the molding powder application, chopped reinforcing fibers, particularly glass fibers, will normally be included.

The molding powder, when used, is molded or pressed to a final desired shape and cured by heating or other initiation (e.g., radiation, electron bombardment, etc.). The molding powder may be stored for extended periods without losing its ability to polymerize when exposed to appropriate conditions.

The cured product according to this invention, after polymerization of the unsaturated polyester resin syrup, will be homogeneous and will have the following characteristics:

a. It will be substantially free of uncombined water;
  b. It will contain at least 5 percent by weight hybrid silica gel uniformly dispersed throughout its mass;
  c. It will contain calcium sulfate dihydrate uniformly dispersed throughout its mass;
  d. At least a portion of the unsaturated polyester resin will contain carboxylate salt groups rather than carboxylic acid end groups.

Thermal curing of the molding powder is carried out at temperatures preferably below about 250° F in order to minimize any tendency of hydrated water to vaporize and also to minimize rupturing and spalling of the resulting product.

EXAMPLE 1

An unsaturated polyester resin syrup I contains 25 parts by weight styrene and 75 parts by weight of an unsaturated polyester resin which is obtained by polyesterification of 16 mols phthalic anhydride
40 mols maleic anhydride
106 mols propylene glycol cooked to a final acid number of about 20.

50 grams of the unsaturated polyester resin syrup I is combined with 50 grams calcium sulfate hemihydrate and mixed well. 15 grams of aqueous sodium silicate containing 63 percent by weight water and having an $SiO_2/Na_2O$ ratio of 3.2 is added to the mixture. The aqueous sodium silicate is commercially available from Philadelphia Quartz Company and is identified by the designation silicate N.

Following the mixing of the two liquids, the mixture thickens rapidly and has the appearance of a modeling clay. After about 15 minutes the mixture is soft and pliable. After sitting overnight the mixture is hard and rocky. The material shows no measurable weight loss.

EXAMPLE 2

Example 1 was repeated with the exception that ½ gram of benzoyl peroxide was added to the unsaturated polyester resin syrup I. After the described mixing the resulting material was allowed to set overnight and then pulverized into a powder passing through a 50 mesh U.S. standard screen. The powder was placed in a heated mold at 100° C and pressed in a press at 2,000 psi. When the mold was removed from the press and the sample removed from the mold, the powder had formed a hard continuous molded product.

Another sample of the powdered material was placed in the bottom of the mold as just described. A sheet of glass fiber veil was applied to the top of the molding powder and the remainder of the mold was filled with a molding powder above the glass fiber veil. The mold was closed, placed in a press at 1,000 psi pressure at 100° C. When the mold was removed, a hard continuous strong product was removed from the mold.

EXAMPLE 3

50 grams of the unsaturated polyester resin syrup I was combined with 60 grams calcium sulfate hemihydrate. 10 grams of aqueous sodium silicate (silicate N) and 2 grams water was combined and added to the mixture. After vigorous mixing there was an immediate increase in viscosity of the mixture. The mixture was flattened between two pieces of cellophane and allowed to stand overnight. After one day the cellophane was removed, the sheet was cut into small strips approximately one-quarter inch wide and one-half inch long. The strips were sealed in a paint can and inspected periodically. After about 30 days, the strips showed no tendency to agglomerate but remained dispersed, soft and pliable.

EXAMPLE 4

50 grams of unsaturated polyester resin I was mixed with 60 grams calcium sulfate hemihydrate, 1 gram of dicumyl peroxide as a catalyst and mixed. A mixture of 10 grams aqueous sodium silicate (silicate N) was mixed with 2 grams of water and this mixture was added to the resin mixture. An immediate viscosity increase was observed. The mixture was flattened between two pieces of cellophane. The following day the sheet was cut in half. The material was pliable. One-half of the sheet was placed in an oven and heated to 250° F for ten minutes. When removed from the oven the piece had hardened to a cured polyester resin product.

EXAMPLE 5

50 grams of unsaturated polyester resin syrup I was combined with 60 grams calcium sulfate hemihydrate (C-base, United States Gypsum Company) and 2 grams of powdered hydrated alumina. 1 gram of dicumyl peroxide was added to the blend as an initiator. A second mixture was produced from 15 grams aqueous sodium silicate (silicate N), 2 grams water and 20 grams hydrated alumina. The two mixtures were then combined and exhibited an immediate viscosity increase. The mixture was flattened between cellophane sheets. The following day the sheet was placed in an oven for 5 minutes at 250° F. When the sheet was removed from the oven it was a hard, cured polyester product. The sheet was placed in the flame of a Bunsen burner for two minutes. There are some smoke generation in the test but no independent flame developed. When the Bunsen burner was removed, the sample retained its shape.

I claim:

1. A semisolid polymerizable composition comprisng the unpolymerized reaction product of:

a. One part by weight of unsaturated polyester resin syrup;

b. 0.1–2.0 parts by weight of aqueous sodium silicate containing 45 to 85 percent by weight water and having a weight ratio $SiO_2/Na_2O$ from 1.5 to 3.75;

c. 0.1–2.0 parts by weight of calcium sulfate hemihydrate; the amount of said calcium sulfate hemihydrate being sufficient to combine with at least 85 percent by weight of the uncombined water which is contained in the other ingredients of the composition.

2. The composition of claim 1 containing an initiator for the plymerization of the unsaturated plyester resin syrup. parts by weight of calcium sulfate hemihydrate; the 3. The method of making a semisolid polymerizable composition which comprises mixing:

a. One part by weight unsaturated polyester resin syrup;

b. 0.1–2.0 parts by weight of aqueous sodium silicate containing 45 to 85 percent by weight water and having a weight ratio $SiO_2/Na_2O$ from 1.5 to 3.75; and c. 0.1–2.0 parts by weight of calcium sulfate hemihydrate; the amount of said calcium sulfate hemihydrate being sufficient to combine with at least 85 percent by weight of the uncombined water which is contained in the other ingredients of the composition; and recovering the reaction product of the said mixture as a polymerizable semisolid composition.

4. The method of claim 3 comprising the additional step of combining the said mixture with 0.1 to 5.0 parts by weight of inert particulate solids as a filler.

5. The method of claim 3 wherein the said mixture is combined with 0.1 to 2.0 parts by weight of glass fibers.

6. The method of claim 3 wherein the mixture includes powdered alumina trihydrate not exceeding the cumulative weight of the said unsaturated polyester resin syrup and the said aqueous sodium silicate.

7. A homogeneous article comprised of 1. polymerized unsaturated polyester resin, at least a portion of which contains carboxylate salt end groups;

2. at least 5 percent by weight of hybrid colloidal silica gel;

3. calcium sulfate dihydrate.

8. The homogeneous article of claim 7 including reinforcing glass fibers.

9. The homogeneous article of claim 7 including inert particulate fillers uniformly dispersed therein.

10. A two stage method for preparing a homogeneous article comprising:

in stage I, mixing a composition including:

a. One part by weight unsaturated polyester resin syrup;

b. 0.1–2.0 parts by weight of aqueous sodium silicate containing 45 to 85 percent by weight water and having a weight ratio $SiO_2/Na_2O$ from 1.5 to 3.75; and c. 0.1–2.0 parts by weight of calcium sulfate hemihydrate; the amount of such calcium sulfate hemihydrate being sufficient to combine with at least 85 percent by weight of the uncombined water which is contained in the other ingredients of the composition; and d. an initiator for the polymerization of the said unsaturated polyester resin syrup;

recovering the reaction product of the said mixture as a polymerizable semisolid composition; and in stage II, shaping a portion of the said polymerizable semisolid composition into the shape of the desired homogeneous article and heating the said portion to a temperature sufficient to activate the said initiator and to cure the said portion; and recovering the said shaped homogeneous article.

11. The method of claim 10 wherein the said polymerizable semisolid composition includes 0.1–2.0 parts by weight of reinforcing glass fibers.

12. The method of claim 10 wherein the said portion is combined with reinforcing glass fibers during the step of shaping the article.

* * * * *